US 8,485,463 B2

(12) United States Patent  
Mori

(10) Patent No.: US 8,485,463 B2
(45) Date of Patent: Jul. 16, 2013

(54) REEL AND RECORDING TAPE CARTRIDGE

(75) Inventor: Yasuhiro Mori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 335 days.

(21) Appl. No.: 12/980,365

(22) Filed: Dec. 29, 2010

(65) Prior Publication Data

US 2011/0168828 A1 Jul. 14, 2011

(30) Foreign Application Priority Data

Jan. 14, 2010 (JP) ................................ 2010-006198

(51) Int. Cl.
*G11B 15/32* (2006.01)
*B65H 75/18* (2006.01)

(52) U.S. Cl.
USPC ..................... 242/609.4; 242/348; 242/608.8; 242/613; 242/613.4

(58) Field of Classification Search
USPC ............... 242/608.8, 609.4, 608, 609, 609.1, 242/610, 610.6, 613, 613.4, 348, 348.2; 360/132
See application file for complete search history.

(56) References Cited

U.S. PATENT DOCUMENTS

| 4,083,509 | A  | * | 4/1978  | Vasudeva et al. | 242/608.8 |
| 4,088,278 | A  | * | 5/1978  | Adair           | 242/608.8 |
| 4,296,890 | A  | * | 10/1981 | Posso           | 242/608.8 |
| 5,564,647 | A  | * | 10/1996 | Bay et al.      | 242/608.8 |
| 6,349,015 | B1 | * | 2/2002  | Hayashi         | 360/132   |
| 7,832,683 | B2 | * | 11/2010 | Ashikawa        | 242/609.4 |
| 2007/0290095 | A1 | * | 12/2007 | Ashikawa    | 242/610.6 |

FOREIGN PATENT DOCUMENTS

JP 2007-335032 A 12/2007

* cited by examiner

*Primary Examiner* — William A Rivera
(74) *Attorney, Agent, or Firm* — SOLARIS Intellctual Property Group, PLLC

(57) ABSTRACT

A reel is provided with a tubular hub, a first flange, a second flange, and positioning portions. A projection portion that projects in a radial direction is formed at an inner periphery face of the hub. The first flange includes a first extension portion which is extended in the axial direction of the hub from a first flange portion and is joined to the projection portion. The second flange includes a second extension portion which is extended in the axial direction of the hub from a second flange portion and is joined to the projection portion. The positioning portions regulate, in the radial direction, positions of distal end portions of the first extension portion and the second extension portion relative to the hub. Gaps are formed between the inner periphery face of the hub and outer periphery faces of the first extension portion and the second extension portion.

6 Claims, 9 Drawing Sheets

REEL AND RECORDING TAPE CARTRIDGE

CROSS-REFERENCE TO RELATED APPLICATION

This application claims priority under 35 USC 119 from Japanese Patent Application No. 2010-006198, filed on Jan. 14, 2010, the disclosure of which is incorporated by reference herein.

BACKGROUND OF THE INVENTION

1. Field of the Invention

The present invention relates to a reel, on which a recording tape such as a magnetic tape or the like that is principally employed as a recording/replaying medium of a computer or the like is wound, and to a recording tape cartridge equipped with the reel.

2. Description of the Related Art

A recording tape such as a magnetic tape or the like that is used as a data recording/replaying medium (data backup) for computers or the like is wound onto a reel made of synthetic resin. A recording tape cartridge that accommodates one such reel in a case has been known heretofore. The reel of this recording tape cartridge may be a reel with a structure in which, for example, a hub around whose outer periphery face the recording tape is wound and an upper flange and a lower flange that retain recording tape width direction end portions of the recording tape are formed as respectively separate bodies (a three-piece structure) (for example, see Japanese Patent Application Laid-Open (JP-A) No. 2007-335032).

A reel with the three-piece (three-component) structure described in JP-A No. 2007-335032 has a structure in which an annular extension portion formed at an inner periphery edge portion of the upper flange and an annular extension portion formed at an inner periphery edge portion of the lower flange are each welded to projection portions protruding from an inner periphery face of the hub. However, in this reel, the annular extension portions are tightly fitted to the inner periphery face of the hub. Therefore, if the hub is deformed inward in the radial direction by pressure due to a recording tape being wound thereon, the annular extension portions may follow this deformation and the upper flange and lower flange may be deformed.

SUMMARY OF THE INVENTION

In consideration of the circumstances described above, an object of the present invention is to provide a reel with a three-piece structure with which, even if a hub is deformed inward in the radial direction by pressure due to a recording tape being wound thereon, flanges joined to the hub may not deform, and a recording tape cartridge equipped with this reel.

A reel relating to a first aspect of the present invention includes: a tubular hub, at an inner periphery face of which a projection portion that projects in a radial direction is formed, and around an outer periphery face of which a recording tape is wound; a first flange including a first flange portion provided at one end portion side of the hub, and a first extension portion that extends in an axial direction of the hub from the first flange portion and is joined to the projection portion; a second flange including a second flange portion provided at another end portion side of the hub, and a second extension portion that extends in the axial direction of the hub from the second flange portion and is joined to the projection portion; and positioning portions that regulate, in the radial direction, positions of distal end portions of the first extension portion and the second extension portion relative to the hub, wherein gaps are formed between the inner periphery face of the hub and outer periphery faces of the first extension portion and the second extension portion.

According to the first aspect of the present invention, in a state in which radial direction positions relative to the hub of the respective distal end portions of the first extension portion of the first flange and the second extension portion of the second flange are regulated by the positioning portions, the first extension portion and the second extension portion are each joined to the projection portion formed at the inner periphery face of the hub, and the gaps are formed between the inner periphery face of the hub and the outer periphery faces of the first extension portion and the second extension portion. Thus, even if the hub is deformed inward in the radial direction by pressure due to a recording tape being wound thereon, there is no risk of the first flange and the second flange deforming to follow this deformation.

In the reel of the first aspect of the present invention, the positioning portions may be formed extending between the inner periphery face of the hub and the projection portion.

In a reel with the structure described above, the first flange and the second flange may be centered relative to the hub in the state in which the gaps are present between the inner periphery face of the hub and the outer periphery faces of the first extension portion and the second extension portion.

In a reel with a structure described above, the positioning portions may include inclined faces at which an inner diameter of the hub becomes smaller toward the projection portion.

In a reel with the structure described above, the respective distal end portions of the first extension portion and the second extension portion may be guided towards the projection portion.

In the reel of the first aspect of the present invention, the projection portion may be formed substantially at the middle of the hub in the axial direction.

In a reel with the structure described above, because the protrusion portion is formed substantially at the axial direction middle of the hub, the hub deforms equally at the two end portion sides about the protrusion portion. Therefore, during storage over long periods and the like, deformation of the recording tape in the state in which the recording tape is wound around the hub may be suppressed, and a deterioration in characteristics of the recording tape may be prevented.

In a reel with a structure described above, the projection portion may be formed in an annular shape.

In a reel with the structure described above, stiffness of the axial direction substantial middle of the hub may be improved.

A recording tape cartridge of a second aspect of the present invention includes: a reel according to the first aspect, on which a recording tape is wound; a case accommodating one of the reel; and a leader member attached to an end portion of the recording tape, which leader member can be drawn out through an aperture formed in the case.

According to the recording tape cartridge of the second aspect of the present invention, even when the hub is deformed inward in the radial direction by pressure due to a recording tape being wound thereon, there is no danger of the first flange and the second flange deforming to follow this deformation. Therefore, during storage over long periods and the like, deformation of the recording tape in the state in which the recording tape is wound around the hub may be suppressed, and a deterioration in characteristics of the recording tape may be prevented.

As described above, according to the present invention, a reel with a three-piece structure may be provided such that there may be no deformation of flanges joined to a hub even when the hub is deformed inward in the radial direction by pressure due to a recording tape being wound thereon, and a recording tape cartridge equipped with this reel may be provided.

DETAILED DESCRIPTION OF THE INVENTION

Herebelow, an exemplary embodiment of the present invention is described in detail on the basis of the attached drawings. For convenience of description, the direction of arrow A shown in FIG. 1 is referred to as a forward direction of a recording tape cartridge 10 (a direction of loading into a drive device), the direction of arrow B is referred to as a rightward direction of the recording tape cartridge 10, and the direction of arrow C is referred to as an upward direction of the recording tape cartridge 10 and a reel 20.

Figure 1:
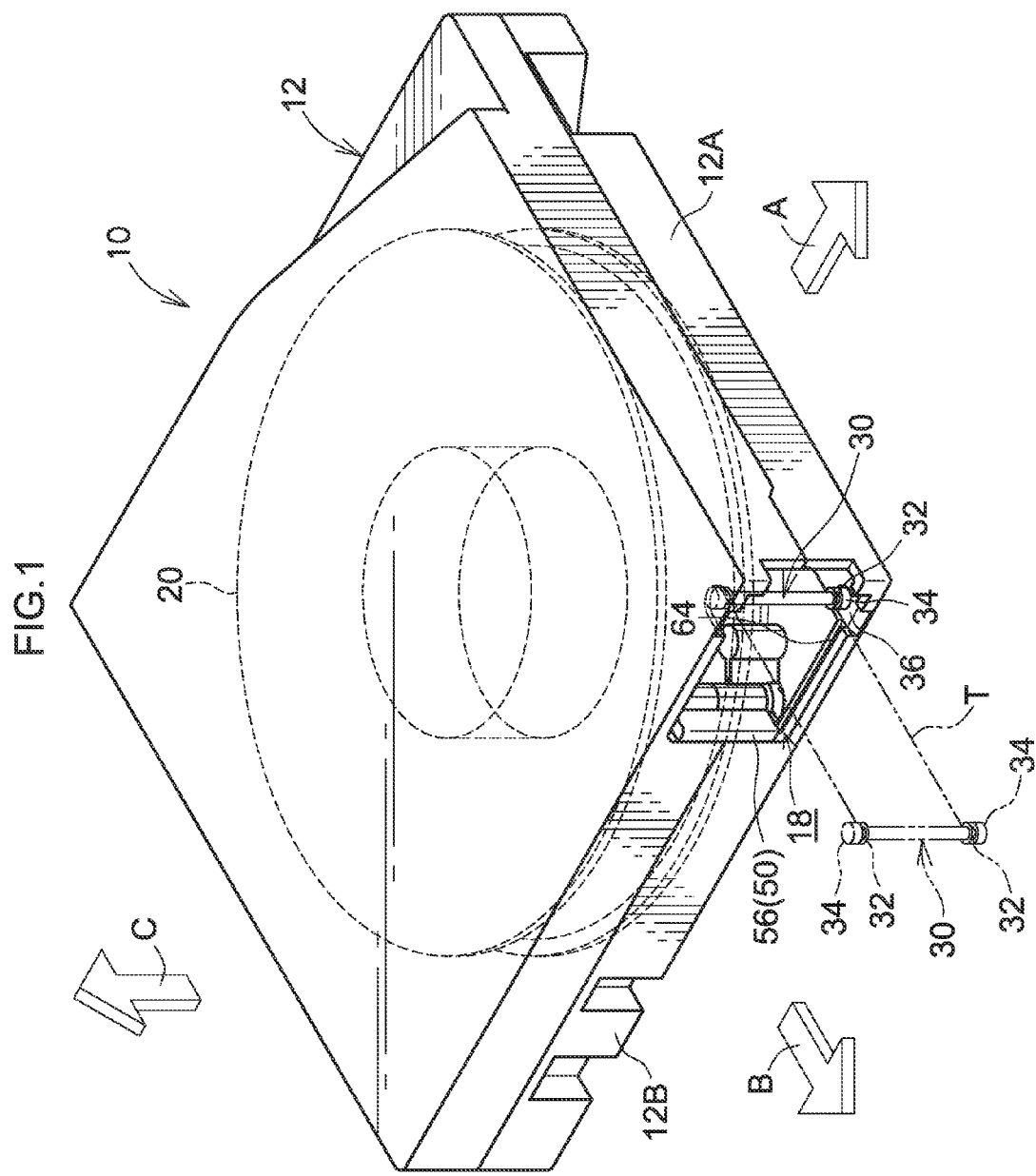
FIG. 1 is a schematic perspective diagram of a recording tape cartridge.
Figure 2:
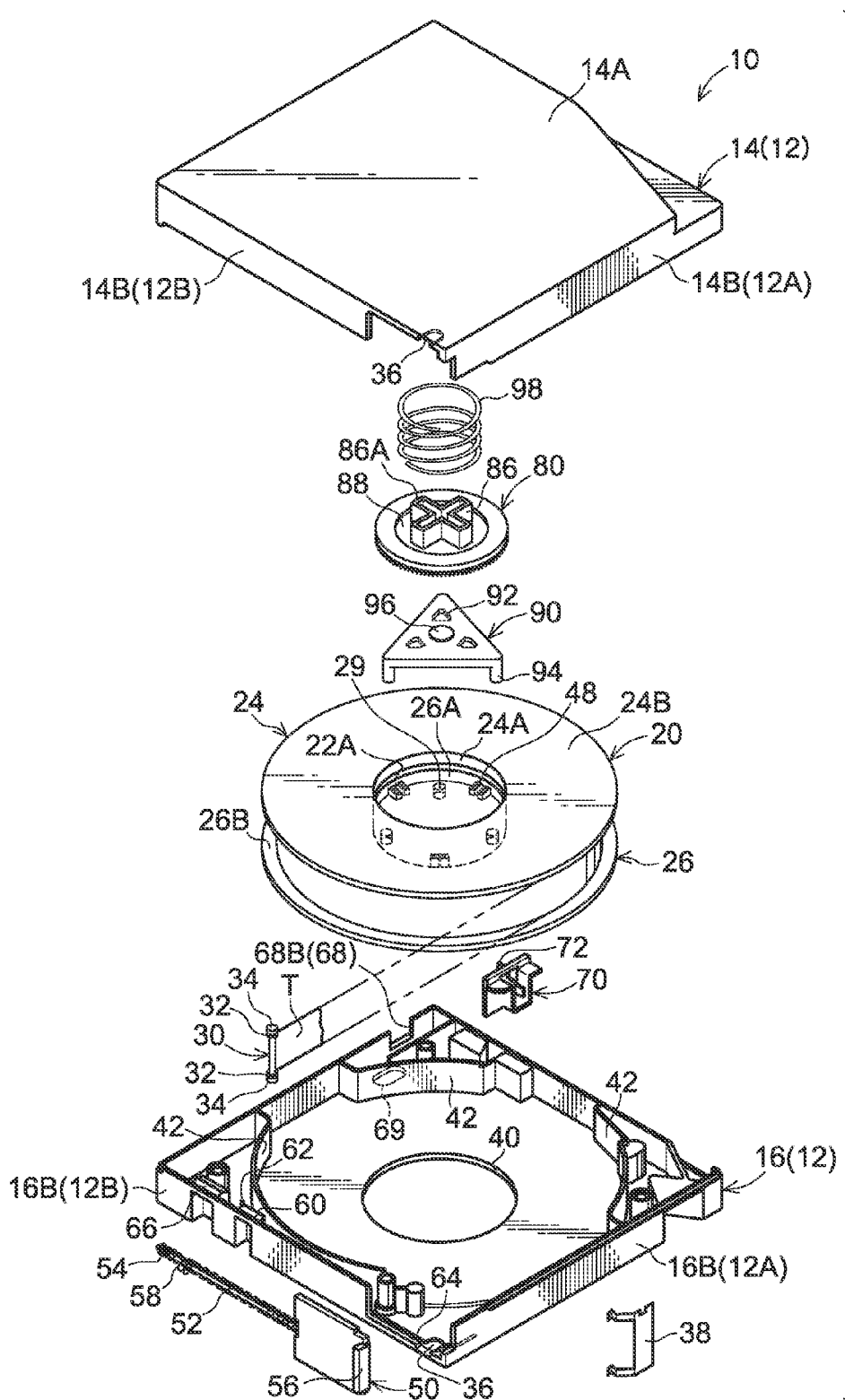
FIG. 2 is a schematic exploded perspective diagram in which the recording tape cartridge is viewed from above.
Figure 3:
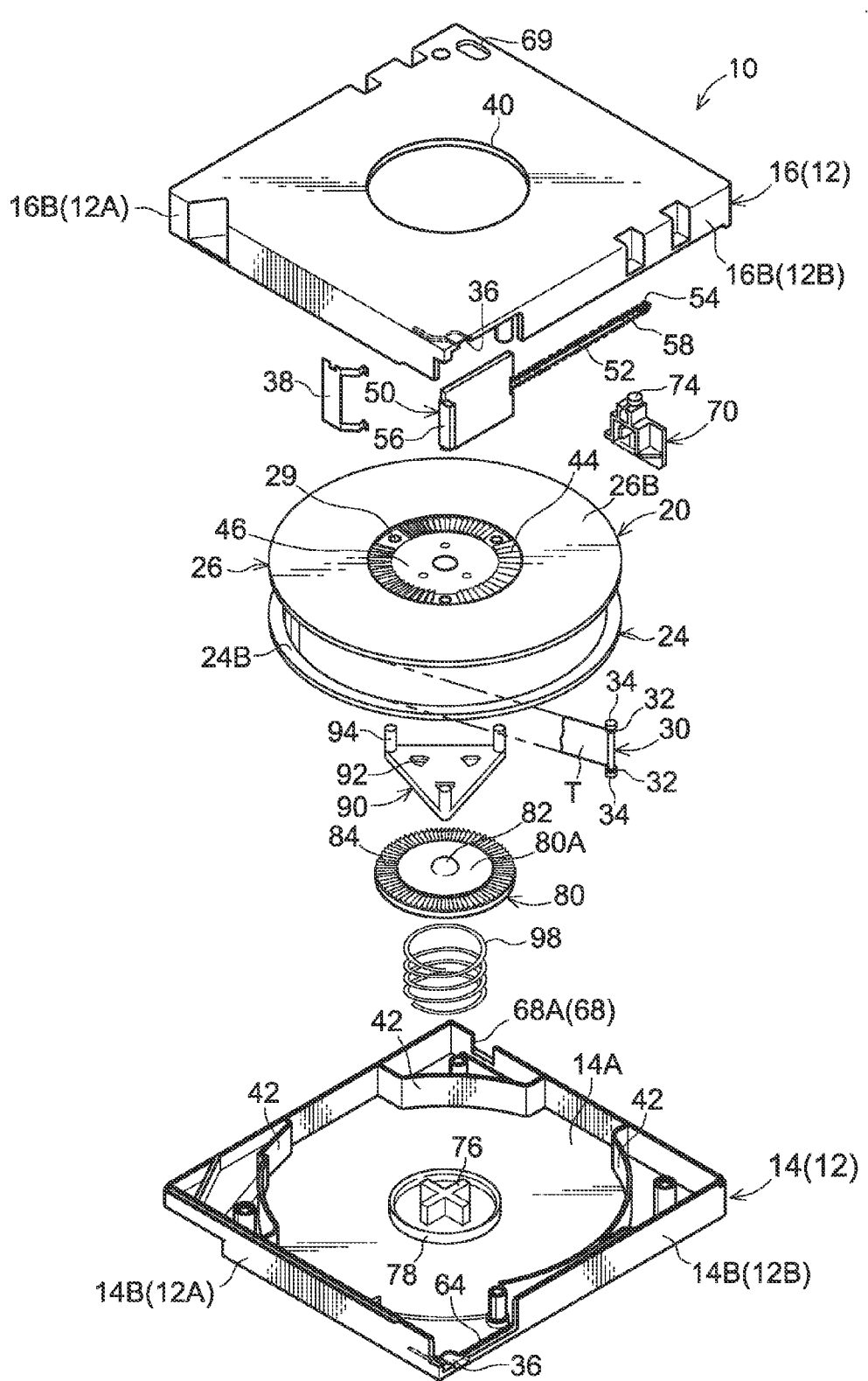
FIG. 3 is a schematic exploded perspective diagram in which the recording tape cartridge is viewed from below.

As illustrated in FIG. 1 to FIG. 3, the recording tape cartridge 10 includes a substantially rectangular box-shaped case 12. The case 12 is constituted by an upper case 14 and a lower case 16, which are made of a synthetic resin such as polycarbonate (PC) or the like. A peripheral wall 14B is provided standing from a peripheral edge of a ceiling plate 14A, and a peripheral wall 16B is provided standing from a peripheral edge of a floor plate 16A. The upper case 14 and the lower case 16 are joined by ultrasonic welding, screw-fixing or the like in a state in which the peripheral wall 14B and the peripheral wall 16B are abutted against one another.

An aperture 18 is formed in a right wall 12B of the case 12. The aperture 18 is for drawing out a recording tape T that has been wound onto the reel 20, which is described below. A leader pin 30 is fixed to a free end portion of the recording tape T that is drawn out through the aperture 18. The leader pin 30 is engaged (caught up) by a drawing member of the drive device (not illustrated) and drawn out for operation. Annular grooves 32 are formed at two end portions of the leader pin 30, which protrude beyond width direction end portions of the recording tape T. The annular grooves 32 are formed so as to be engageable by hooks or the like of the drawing member.

A pair of upper and lower pin retention portions 36 are provided inside the case 12, at the inner side of the aperture 18 of the case 12, that is, at an inner face of the ceiling plate 14A of the upper case 14 and an inner face of the floor plate 16A of the lower case 16. The pin retention portions 36 position and retain the leader pin 30. The pin retention portions 36 are formed in substantially semi-circular shapes opening to the side to which the recording tape T is drawn out. Two end portions 34 of the leader pin 30, in an upright state, can enter and leave the pin retention portions 36 through the opening side.

A plate spring 38 is fixedly disposed in a vicinity of the pin retention portions 36. A bifurcated distal end portion of the plate spring 38 engages with each of the upper and lower end portions 34 of the leader pin 30, so as to retain the leader pin 30 in the pin retention portions 36. The distal end portions of the plate spring 38 are structured to resiliently deform as appropriate and allow movement of the leader pin 30 when the leader pin 30 is entering or leaving the pin retention portions 36.

The aperture 18 is opened and closed by a door 50. The door 50 is formed in a substantially rectangular plate shape with a size capable of closing off the aperture 18. Groove portions 64, into which upper and lower end portions of the door 50 are slidably fitted, are formed in the ceiling plate 14A and the floor plate 16A at the inside of the aperture 18, such that the door 50 may move along the right wall 12B of the case 12.

A shaft 52 is provided protruding from the middle of a rear end portion of the door 50. A coil spring 58 is fitted around this shaft 52. A broadened portion 54 that prevents the coil spring 58 from falling off is formed at a rear portion of the shaft 52. A support plate 60 is provided protruding from the lower case 16. The support plate 60 includes an engaging portion 62 that engages with the rear end of the coil spring 58 fitted around the shaft 52.

Thus, the door 50 is a structure in which the shaft 52 is supported at the support plate 60 to be slidable and the rear end of the coil spring 58 is engaged with the engaging portion 62. Therefore, the door 50 is urged in the direction of closing off the aperture 18 by urging force of the coil spring 58. It is also desirable if a support plate 66 that supports the shaft 52 during opening of the aperture 18 is protrudingly provided at the rearward side of the support plate 60.

A projection 56 for opening and closing operations is provided protruding outward from a front end portion of the door 50. In association with loading of the recording tape cartridge 10 into a drive device, the projection 56 engages with an opening/closing member at the drive device (not illustrated). Thus, this is a structure in which the door 50 is opened against the urging force of the coil spring 58.

A write-protect switch 70 that sets whether recording onto the recording tape T is enabled or disabled is provided, to be slidable to right and left, at a rear-left portion of the case 12. A hole 68 is formed in the rear wall of the case 12. An operation protrusion 72 for manual operation of the write-protect switch 70 protrudes through the hole 68. A cutaway portion 68A is formed in the peripheral wall 14B of the upper case 14, and a cutaway portion 68B is formed in the peripheral wall 16B of the lower case 16. In this structure, the hole 68 is formed by the cutaway portion 68A and the cutaway portion 68B when the upper case 14 and the lower case 16 are joined together.

A long hole 69 with length in the left-right direction is incised in the lower case 16. A protrusion portion 74 of the write-protect switch 70 is exposed through the long hole 69. When the recording tape cartridge 10 is loaded into the drive device, the position of the write-protect switch 70 is detected at the drive device, and it is automatically determined whether or not recording to the recording tape T is enabled or disabled. The protrusion portion 74 does not protrude beyond a lower face of the lower case 16.

Figure 4:
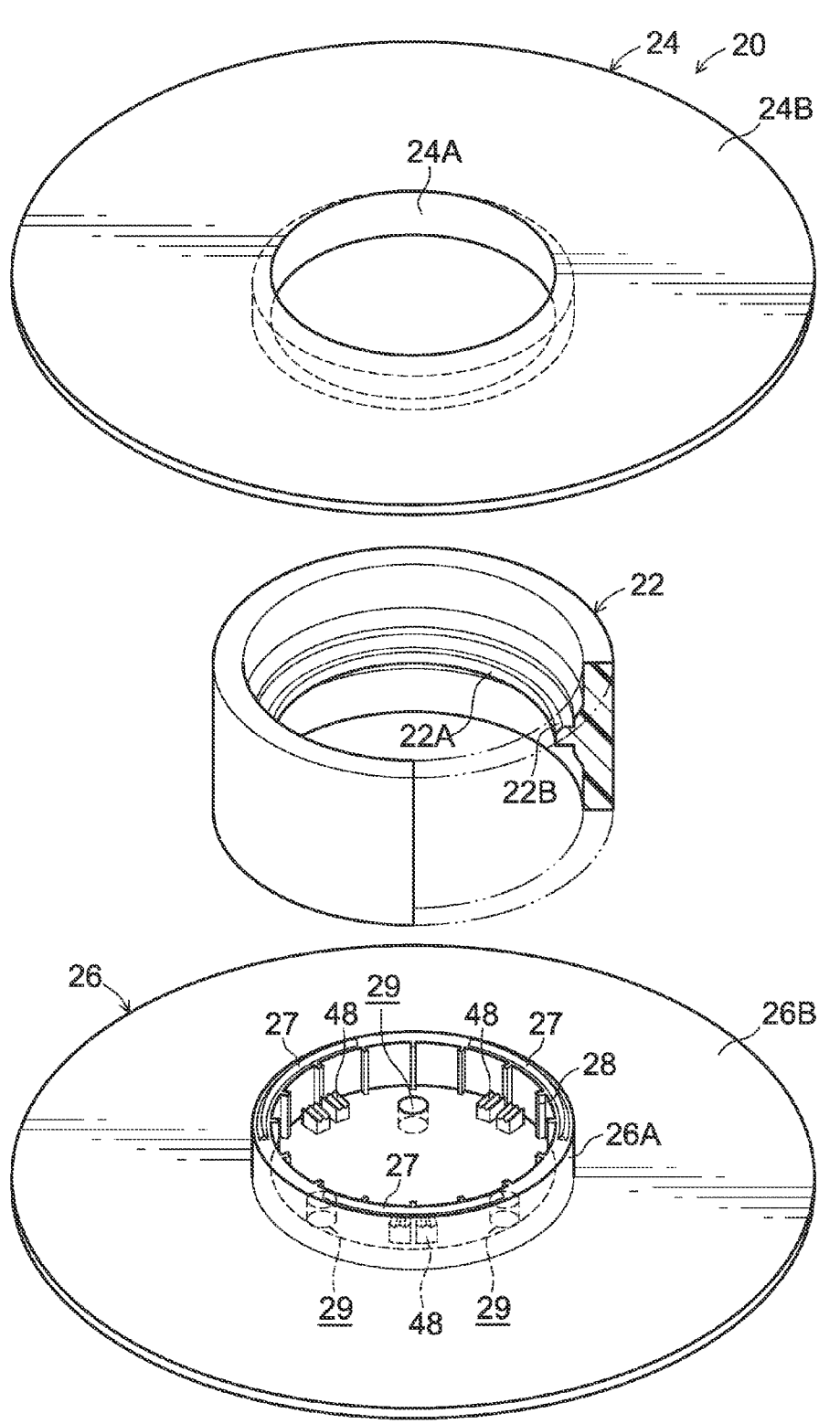
FIG. 4 is a schematic exploded perspective diagram illustrating structure of a reel.
Figure 5:
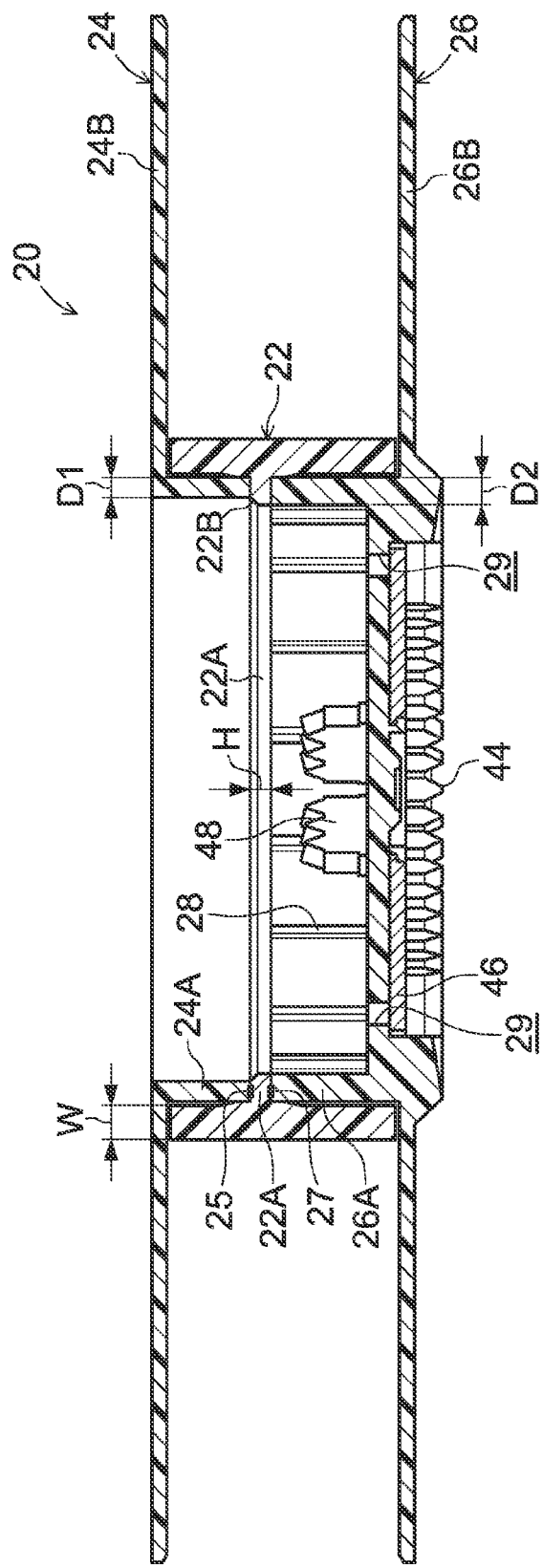
FIG. 5 is a schematic side sectional diagram illustrating structure of the reel.
Figure 6:
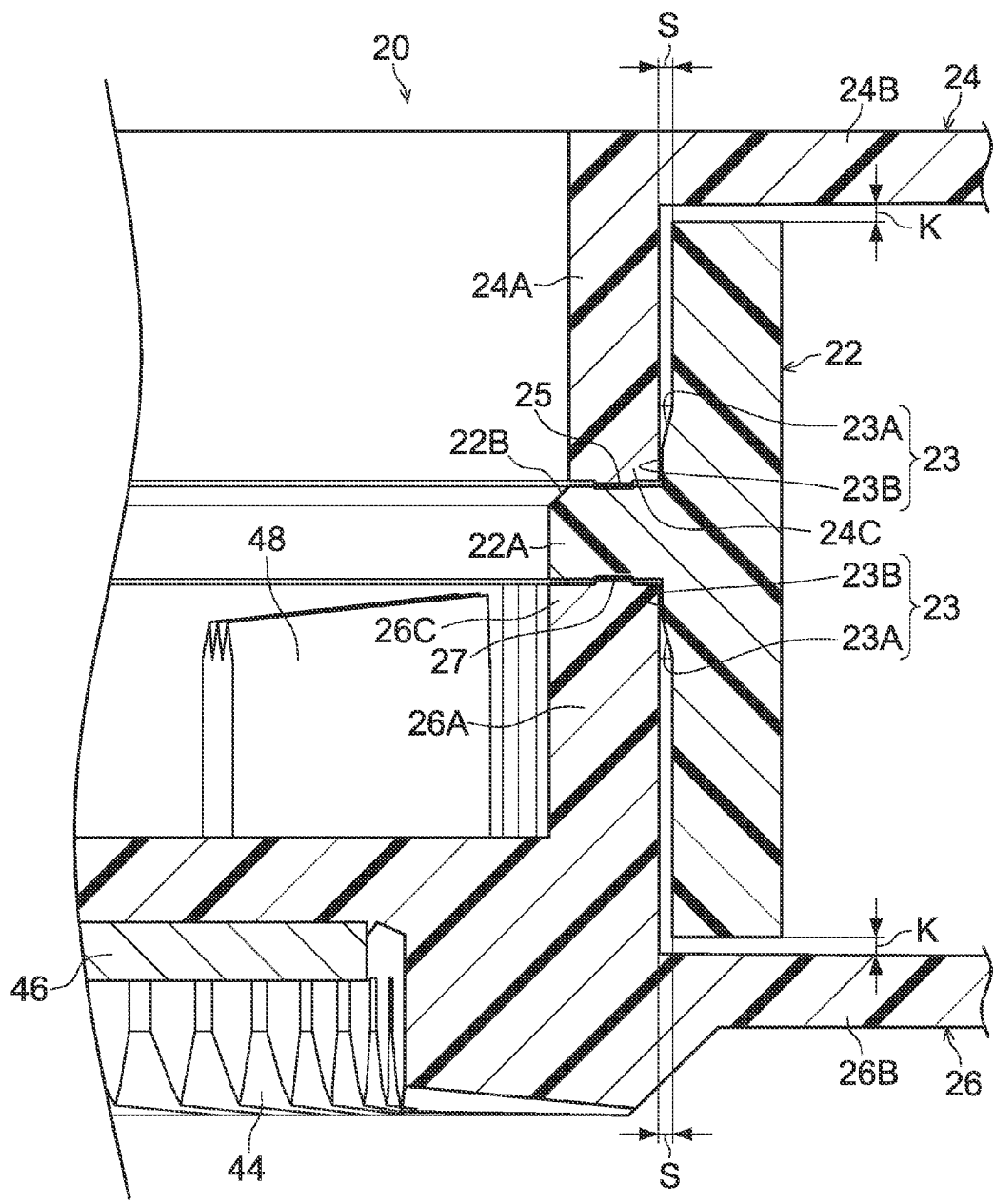
FIG. 6 is a partial magnified schematic side sectional diagram illustrating the structure of the reel.

The single reel 20, which is made of a synthetic resin such as polycarbonate (PC) or the like, is rotatably accommodated inside the case 12. As illustrated in FIG. 4 to FIG. 6, the reel 20 is structured to include a tubular reel hub 22, an annular upper flange 24 and a circular plate-shaped lower flange 26. The reel hub 22 constitutes an axial middle portion of the reel 20. The upper flange 24 serves as a first flange that is provided at an upper end portion side of the reel hub 22. The lower flange 26 serves as a second flange that is provided at a lower end portion side of the reel hub 22.

A projection portion 22A is annularly (circumferentially) provided protruding from substantially the middle in the height direction (axial direction) of an inner periphery face of the reel hub 22. The projection portion 22A has a substantially trapezoid cross-section that protrudes to a predetermined length to the radial direction inner side (toward the center of rotation of the reel 20). The recording tape T, which is a magnetic tape or the like that serves as an information recording and replaying medium, is wound around an outer peripheral face of the reel hub 22. Width direction end portions of the recording tape T that has been wound around are retained by a flange portion 24B of the upper flange 24 (described below) and a flange portion 26B of the lower flange 26 (described below).

The upper flange 24 includes the upper flange portion 24B and an annular extension portion 24A. The flange portion 24B serves as a first flange portion that is provided at the upper end portion side of the reel hub 22. The annular extension portion 24A is provided extending downward in the axial direction of the reel hub 22 from an inner periphery edge portion of the flange portion 24B. Similarly, the lower flange 26 includes the lower flange portion 26B and an annular extension portion 26A. The flange portion 26B serves as a second flange portion that is provided at the lower end portion side of the reel hub 22. The annular extension portion 26A is provided extending upward in the axial direction of the reel hub 22 from an upper face of the flange portion 26B, from a predetermined position at which the annular extension portion 26A may coaxially oppose the annular extension portion 24A.

Ribs 27 for welding (see FIG. 4) are provided, plurally (for example, three) at equidistant intervals, protruding from an upper face of the annular extension portion 26A. Ribs 25 for welding (see FIG. 6) are provided, plurally (for example, three) at equidistant intervals, protruding from a lower face of the annular extension portion 24A. Hence, in this structure, the upper face of the annular extension portion 26A is welded by ultrasound (joined) to a lower face of the projection portion 22A, and the lower face of the annular extension portion 24A is welded by ultrasound (joined) to an upper face of the projection portion 22A.

That is, heights (axial direction lengths) of the annular extension portion 24A and the annular extension portion 26A are approximately half of a height of the reel hub 22 from which a height (thickness) H of the projection portion 22A (see FIG. 5) is subtracted. The reel hub 22 is provided to be relatively non-rotatable at the outer periphery faces of the annular extension portion 24A and the annular extension portion 26A.

Here, predetermined clearances K (see FIG. 6) are formed between an upper end face of the reel hub 22 and the lower face of the upper flange 24 and between a lower end face of the reel hub 22 and the upper face of the lower flange 26. In other words, dimensions of the respective portions are determined such that the upper end face of the reel hub 22 is not in contact with the lower face of the upper flange 24 and the lower end face of the reel hub 22 is not in contact with the upper face of the lower flange 26 (i.e., such that the same do not touch).

As is illustrated in detail in FIG. 6, positioning portions 23 that regulate positions of the annular extension portion 24A and the annular extension portion 26A in the radial direction are formed extending (straddling) between the inner periphery face of the reel hub 22 and each of the upper face and lower face of the projection portion 22A.

Each positioning portion 23 is structured with, for example, an inclined face 23A and a position regulation face 23B. At the inclined face 23A, the inner diameter of the reel hub 22 progressively becomes smaller toward the projection portion 22A. The position regulation face 23B is continuous with the inclined face 23A and is formed so as to be parallel with the inner periphery face of the reel hub 22. Positions of the annular extension portion 24A and the annular extension portion 26A in the radial direction are regulated and the upper flange 24 and the lower flange 26 are each centered (aligned) with respect to the reel hub 22 by the position regulation faces 23B.

Clearances between the position regulation faces 23B and the outer periphery faces of the annular extension portions 24A and 26A are around 0.03 mm. Respective predetermined clearances (gaps) S are formed by the positioning portions 23 (the inclined faces 23A) between the inner periphery face of the reel hub 22 at the upper side relative to the projection portion 22A (the position regulation face 23B) and the outer periphery face of the annular extension portion 24A and between the inner periphery face of the reel hub 22 at the lower side relative to the projection portion 22A (the position regulation face 23B) and the outer periphery face of the annular extension portion 26A (for example, S=0.2 mm or more).

The extension length (width) of the projection portion 22A to the radial direction inner side is the same as a wall thickness (thickness) D2 of the annular extension portion 26A of the lower flange 26 (see FIG. 5). A taper face 22B with a predetermined angle is formed at a radial direction inner side upper portion of the projection portion 22A. A wall thickness (thickness) D1 of the annular extension portion 24A (see FIG. 5) is the same as a radial direction width of the upper face of the projection portion 22A excluding the taper face 22B.

Figure 8:
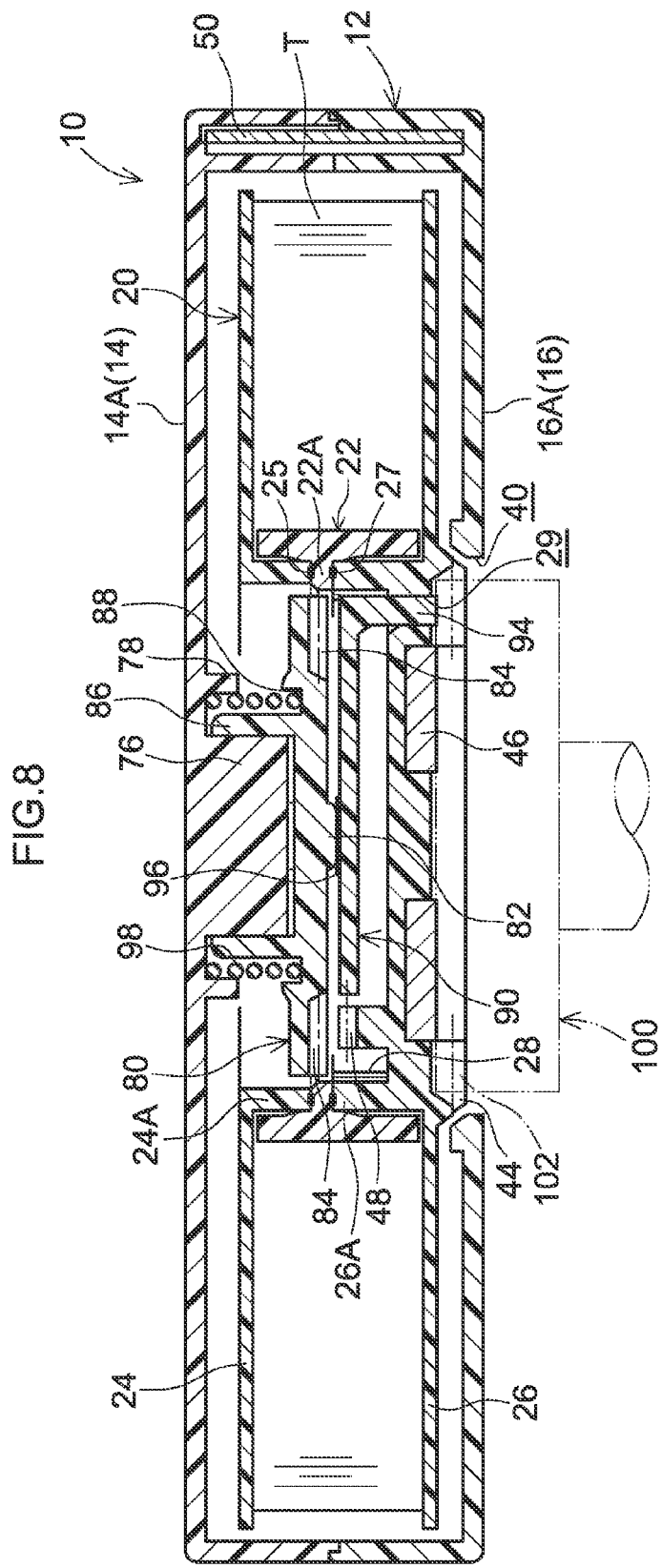
FIG. 8 is a schematic side sectional diagram illustrating the recording tape cartridge after the meshing of the driving gear with the rotary shaft.

With this structure, when a brake member 80 (described below), which is provided inside the interior of the reel hub 22, is moved upward to a lock release position, the brake member 80 does not interfere with the projection portion 22A, because of the taper face 22B (see FIG. 8). The height (thickness) H of the projection portion 22A is smaller than a wall thickness W of the reel hub 22 (see FIG. 5). A gate (not illustrated) that serves as an injection aperture for resin material during molding of the reel hub 22 is singly or plurally provided at a distal end face (radial direction inner face) of the projection portion 22A.

Figure 7:
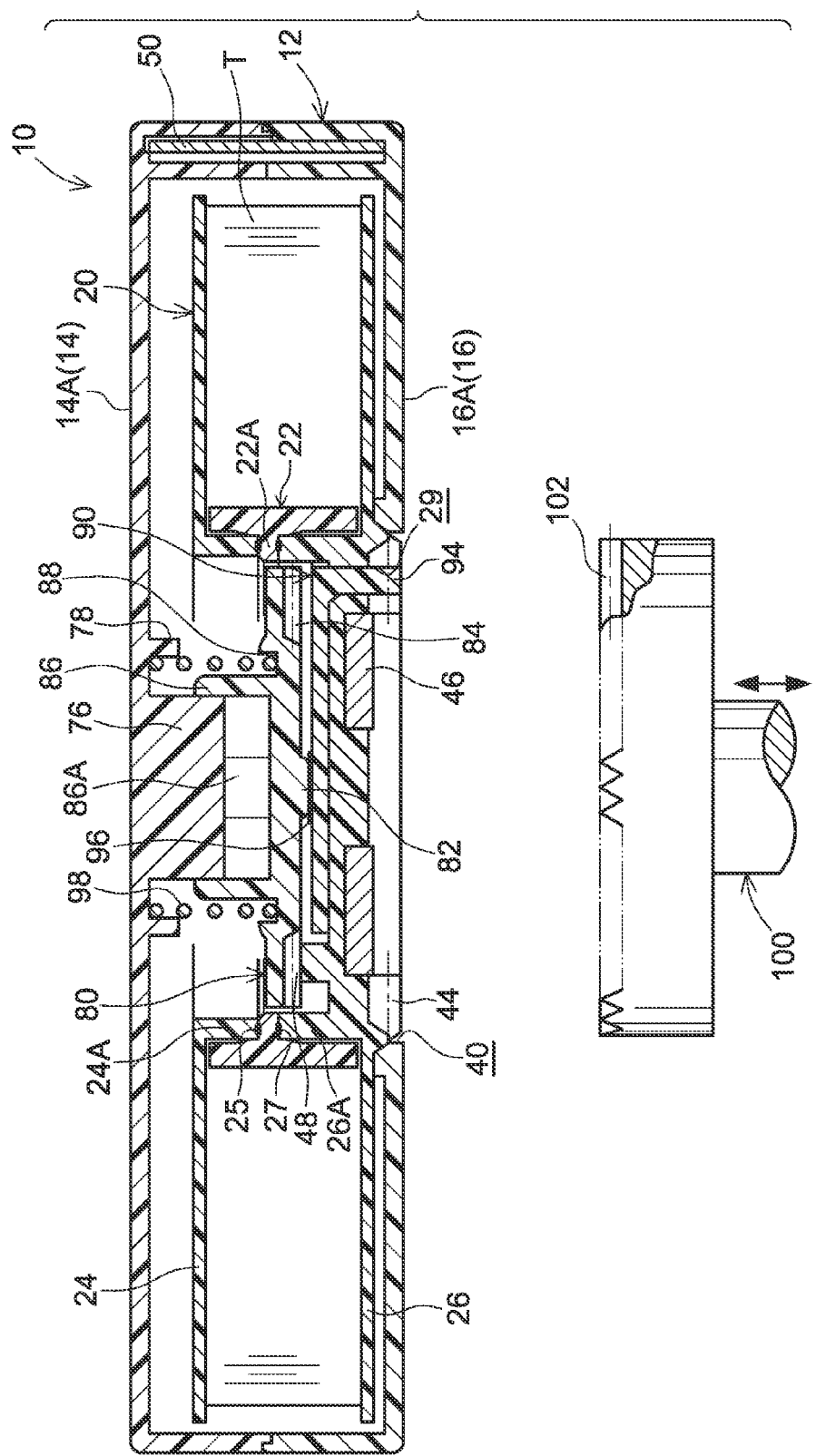
FIG. 7 is a schematic side sectional diagram illustrating the recording tape cartridge before meshing of a driving gear with a rotary shaft.

As illustrated in FIG. 1 to FIG. 3, a reel gear 44 is annularly formed at the lower face of the lower flange 26. A gear aperture 40 is incised substantially at the center of the lower case 16, for exposing the reel gear 44 to the outside. When the reel gear 44 exposed through this gear aperture 40 is meshed with a driving gear 102 formed at a rotary shaft 100 of the drive device (see FIG. 7 and FIG. 8) and driven to turn, the reel 20 relatively rotates inside the case 12 with respect to the case 12.

An annular reel plate 46 formed of a magnetic material is fixed by insert-molding or the like at the lower face of the lower flange 26, at the radial direction inner side of the reel gear 44. The reel plate 46 is attracted and retained by magnetic force of an annular magnet (not illustrated) that is provided at the rotary shaft 100 of the drive device. The reel 20 is retained so as not to move loosely by a free play-restricting wall 42, which is provided protruding from portions of the respective inner faces of the upper case 14 and the lower case 16, and which serves as an inner wall along a circular path that is coaxial with the gear aperture 40.

As illustrated in FIG. 4 and FIG. 5, engaging gears 48 are plurally provided at equidistant intervals (for example, three gears at 120° intervals) standing from predetermined positions on a circular path coaxial with the lower flange 26, at the radial direction inner side of the lower flange 26 relative to the annular extension portion 26A. Penetrating holes 29 are plurally incised at equidistant intervals between the engaging gears 48 (for example, three holes at 120° intervals), at predetermined positions of the reel gear 44 in bottom plan view. The brake member 80, with, for example, a disc shape formed of a resin material such as polyacetal (POM) or the like, is inserted into the interior of the reel hub 22.

As illustrated in FIG. 1 to FIG. 3, a braking gear 84, which is meshable with the engaging gears 48, is annularly formed at a peripheral edge portion of a lower face 80A of the brake member 80. A rotation-restricting rib 76, with a substantial cross shape in plan view, is provided protruding downward from the inner face of the ceiling plate 14A of the upper case 14. At an upper face of the brake member 80, an engaging wall portion 86 includes a groove portion 86A with a substantial cross shape in plan view, inside which the rotation-restricting rib 76 is inserted. The engaging wall portion 86 is provided to stand slightly higher than a height of the rotation-restricting rib 76. Thus, with this structure, the brake member 80 is made incapable of rotation relative to the case 12 (the upper case 14), and the brake member 80 is movable in the up-down direction, being guided so as not to tilt inside the reel hub 22.

A compression coil spring 98 is disposed between the upper case 14 and the brake member 80. That is, the compression coil spring 98 is disposed in a state in which one end thereof is abutted against the inside of an annular protrusion 78 that is protrudingly provided at the upper case 14 at the outer side of the rotation-restricting rib 76 (i.e., abutted between the rotation-restricting rib 76 and the annular protrusion 78), and the other end of the compression coil spring 98 is abutted against the inside of an annular groove 88 that is formed in the upper face of the brake member 80. Thus, this is a structure in which a position of the compression coil spring 98 does not shift in the radial direction, and the brake member 80 is continuously urged downward by urging force of the compression coil spring 98.

Therefore, when not in use (when not loaded in a drive device), the recording tape cartridge 10 is put into a state in which the braking gear 84 meshes with the engaging gears 48, and a locked state in which relative rotation of the reel 20 with respect to the case 12 is blocked. The reel 20 is pressed toward the lower case 16 by the urging force, and the reel gear 44 is exposed through the gear aperture 40. In order to suppress looseness of the brake member 80 inside the reel hub 22 (misplacement in the radial direction), ribs for position regulation 28 may be plurally provided at equidistant intervals on the inner periphery face of the annular extension portion 26A, with lengths extending over the whole height of the inner periphery face (see FIG. 4 and FIG. 5).

A release member 90 is provided inside the reel hub 22, at the lower side of the brake member 80 (i.e., between the lower flange 26 and the brake member 80). The release member 90 has a substantially equilateral triangle shape in plan view, formed of, for example, a resin material such as polybutylene terephthalate (PBT) or the like. Penetrating holes 92 are plurally incised in the release member 90 with predetermined shapes at suitable positions (three holes with hexagonal shapes in the illustrated case), enabling a reduction in weight of the release member 90.

Substantially cylindrical leg portions 94 are provided protruding from a lower face of the release member 90, at the corner portions of the lower face thereof. The leg portions 94 are inserted through the penetrating holes 29 and protrude downward to a predetermined height beyond the reel gear 44 of the lower flange 26. Thus, with this structure, the leg portions 94 are pushed up in accordance with an operation in which the driving gear 102 of the rotary shaft 100 meshes with the reel gear 44, and the brake member 80 is pushed upward via the release member 90.

Herein, the structure is such that even when the release member 90 is raised to a highest position (usually by around 2 mm to 3 mm), the leg portions 94 are not completely removed from the penetrating holes 29. A flat face portion 96 with a circular shape in plan view is formed at the center of an upper face of the release member 90. A release protrusion 82 with a substantially hemispherical shape, which is provided protruding from the middle of the lower face 80A of the brake member 80, abuts against the flat face portion 96. Thus, an area of abutting between the brake member 80 and the release member 90 is reduced, and sliding resistance during rotation of the reel 20 is moderated.

Next, operations are described for the recording tape cartridge 10 and the reel 20 with structures as described above. When the recording tape cartridge 10 with the structure described above is not in use (during storage, during transportation or the like), the aperture 18 is closed off by the door 50. Then, when the recording tape T is to be used, a front wall 12A is oriented forward and the recording tape cartridge 10 is loaded into a drive device in the direction of arrow A.

Hence, first, the opening and closing member provided at the drive device engages with the projection 56 of the door 50. In this state, when the recording tape cartridge 10 moves further in the direction of arrow A, the opening and closing member moves the projection 56 relatively rearward against the urging force of the coil spring 58. Therefore, the door 50 from which the projection 56 protrudes slides rearward in the groove portions 64 along the right wall 12B, and opens up the aperture 18.

When the recording tape cartridge 10 is loaded to a predetermined depth in the drive device and the aperture 18 is completely opened in this manner, a positioning member of the drive device (not illustrated) relatively enters into a positioning hole portion formed in the lower case 16 (not illustrated). Here, the meaning of the term "relatively" includes a case in which the recording tape cartridge 10 descends and a case in which the positioning member rises, and the term "relatively" similarly applies to cases herebelow. Thus, the recording tape cartridge 10 is accurately positioned at a predetermined position in the drive device, and further sliding (rearward movement) of the door 50 is restricted.

When the recording tape cartridge 10 is positioned at the predetermined position, the rotary shaft 100 relatively enters therein through the gear aperture 40, and the driving gear 102 is meshed with the reel gear 44. Hence, in accordance with the operation of meshing the driving gear 102 with the reel gear 44, the leg portions 94 protruding through the reel gear 44 are pushed upward against the urging force of the compression coil spring 98, the brake member 80 is pushed upward via the release member 90, and meshing between the braking gear 84 and the engaging gears 48 is released.

In the state in which the driving gear 102 and the reel gear 44 are completely meshed, the reel plate 46 is attracted and retained by the magnetic force of the annular magnet (not illustrated) that is provided at the inner side of the driving gear 102. Thus, the reel 20 is put into a lock release state (see FIG. 8) in which the reel 20 is relatively rotatable in the case 12 with respect to the case 12, while the meshing of the reel gear 44 with the driving gear 102 is maintained.

A drawing member provided at the drive device enters into the case 12 through the opened aperture 18, catches onto the leader pin 30 that is positioned and retained at the pin retention portions 36, and draws out the leader pin 30. Here, because the recording tape cartridge 10 is accurately positioned in the drive device, the drawing member may reliably engage hooks thereof with the annular grooves 32 of the leader pin 30. Moreover, because the locked state of the reel 20 has been released, the reel 20 turns in association with the drawing operation.

The leader pin 30 that has been taken out from the aperture 18 in this manner is accommodated at an unillustrated winding reel. Then, the winding reel and the reel 20 are driven to turn synchronously. Thus, the recording tape T is wound onto the winding reel while being serially drawn out from the case 12. Recording and/or replay of information is carried out by a recording/replay head (not illustrated) disposed on a predetermined tape path.

When recording and/or replay of information has ended and the recording tape cartridge 10 is to be ejected from the drive device, first, the rotary shaft 100 is turned in reverse. Thus, the recording tape T is wound back onto the reel 20. Then, when the recording tape T has been completely wound back onto the reel 20 and the leader pin 30 is retained at the pin retention portions 36, the positioning member is relatively removed from the positioning hole portion, the rotary shaft 100 is relatively removed from the gear aperture 40, and the meshing of the driving gear 102 with the reel gear 44 is disengaged.

Hence, the brake member 80 and the release member 90 are pressed downward by the urging force of the compression coil spring 98, the leg portions 94 inserted through the penetrating holes 29 protrude downward to the predetermined height from the bottom face of the lower flange 26 over the reel gear 44, and the braking gear 84 meshes with the engaging gears 48. Thus, the reel 20 is put into the locked state in which relative rotation thereof in the case 12 is blocked (see FIG. 7).

Thereafter, the recording tape cartridge 10 is moved in the opposite direction to the direction of arrow A by an unillustrated ejection mechanism. Hence, in association with this movement, the door 50 slides in the direction of closing the aperture 18 due to the urging force of the coil spring 58, and the aperture 18 is completely closed off (returned to the initial state thereof). The recording tape cartridge 10 in which relative rotation of the reel 20 with respect to the case 12 has been locked and the aperture 18 has been closed off in this manner is completely ejected from inside the drive device.

Herein, the reel 20 that is accommodated in the recording tape cartridge 10 has a three-piece structure formed of the reel hub 22, the upper flange 24 and the lower flange 26. Specifically, the projection portion 22A that projects with a predetermined length toward the radial direction inner side of the reel hub 22 (toward the center of rotation of the reel 20) is provided protruding annularly from approximately the middle in the height direction (the axial direction) of the inner periphery face of the reel hub 22. In addition, the annular extension portions 24A and 26A with predetermined heights that are inserted inside the reel hub 22 are formed integrally with the upper flange 24 and the lower flange 26.

Thus, the annular extension portions 24A and 26A of the upper flange 24 and the lower flange 26 are inserted inside the reel hub 22, the upper face of the annular extension portion 26A is welded (joined) to the lower face of the projection portion 22A, and the lower face of the annular extension portion 24A is welded (joined) to the upper face of the projection portion 22A. Thus, the reel 20 with the three-piece structure is assembled with the reel hub 22 being disposed at the outer periphery face side of the annular extension portions 24A and 26A.

Thus, the reel 20 relating to the present exemplary embodiment has a configuration in which the annular extension portions 24A and 26A that are integrally formed at the upper flange 24 and the lower flange 26 are welded (joined) to the projection portion 22A projecting from the inner periphery face of the reel hub 22. Consequently, it is easy to weld the upper flange 24 and the lower flange 26 to the reel hub 22, and the weld strength may be improved.

Furthermore, when the annular extension portions 24A and 26A of the upper flange 24 and the lower flange 26 are being inserted into the reel hub 22, positions of the annular extension portions 24A and 26A in the radial direction are regulated by the positioning portions 23 formed at the inner periphery face of the reel hub 22.

That is, when the annular extension portions 24A and 26A of the upper flange 24 and the lower flange 26 are inserted into the reel hub 22, a lower end portion (distal end portion) 24C and an upper end portion (distal end portion) 26C, respectively thereof (see FIG. 6), are guided by the inclined faces 23A of the positioning portions 23 and guided to the position regulation faces 23B, and positions thereof in the radial direction are regulated by the position regulation faces 23B. Therefore, the upper flange 24 and the lower flange 26 are properly centered (aligned) relative to the reel hub 22, and ease of assembly during welding of the annular extension portions 24A and 26A to the projection portion 22A may be improved.

When the reel 20 has been assembled, the predetermined clearances K are formed between the upper end face of the reel hub 22 and the lower face of the upper flange 24 and between the lower end face of the reel hub 22 and the upper face of the lower flange 26. In addition, the predetermined clearances S are formed by the positioning portions 23 between the inner periphery face of the reel hub 22 and the outer periphery faces of the annular extension portion 24A and the annular extension portion 26A.

Therefore, if a winding amount of the recording tape T is increased and pressure due to the tape being wound on increases and the reel hub 22 resiliently deforms (warps) to the radial direction inner side, the upper flange 24 and the lower flange 26 do not follow this deformation. That is, because the clearances S are provided in addition to the clearances K, deformations of the upper flange 24 and the lower flange 26 may be prevented. Therefore, the reel 20 may be provided to be adaptable to an increase in recording capacity.

Because the projection portion 22A is formed substantially at the middle in the height direction (axial direction) of the reel hub 22, the reel hub 22 resiliently deforms equally to above and below about the projection portion 22A (in a shape that is symmetrical between the above and below). Therefore, regardless of an environment in which the recording tape cartridge 10 is stored, deformation of the recording tape T in the state in which the tape is wound around the reel 20 may be suppressed, and a deterioration in characteristics of the recording tape T when the recording tape cartridge 10 is stored for long periods or the like may be prevented.

In particular, the projection portion 22A is formed in the annular shape along the inner periphery face of the reel hub 22, and the projection portion 22A may improve stiffness of the approximate middle in the height direction (axial direction) of the reel hub 22. Thus, the reel hub 22 is resiliently deformed equally to above and below about the projection portion 22A and deformation of the recording tape T in the state in which the recording tape T is wound around the reel 20 may be further suppressed or prevented.

The extension length of the projection portion 22A is the same as the wall thickness (thickness) D2 of the annular extension portion 26A at the side of the lower flange 26, and the taper face 22B is formed at the radial direction inner side upper portion of the projection portion 22A. Thus, at the locked position, the position of the brake member 80 in the radial direction may be excellently regulated (the brake member 80 may be positioned toward the center of rotation of the reel 20), and at the lock release position, the brake member 80 may not interfere with the projection portion 22A.

The height (thickness) H of the projection portion 22A is smaller than the wall thickness W of the reel hub 22, and a gate (not illustrated) that serves as an injection aperture of resin material when the reel hub 22 is molded is singly or plurally provided at the distal end face (radial direction inner face) of the projection portion 22A. Consequently, when the reel hub 22 is being molded, the resin material injected through the gates/gates flows excellently from the projection portion 22A to upper end portions and lower end portions of the reel hub 22.

Therefore, even with the reel hub 22 from whose inner periphery face the projection portion 22A is protruded, shrinkage deformation due to variations in cooling times of the resin material may be prevented from occurring. That is, even the reel hub 22 from whose inner periphery face the projection portion 22A is protruded may be formed accurately.

While it is desirable if the projection portion 22A and the positioning portions 23 are formed in annular shapes as illustrated, the same may for example, be formed intermittently at equidistant intervals. Specifically, provided the positioning portion 23 is formed at at least three locations (three points) at equidistant intervals, the upper flange 24 and the lower flange 26 may be centered (aligned) relative to the reel hub 22.

The shape of each positioning portion 23 is not to be limited to the shape illustrated in FIG. 6. It is sufficient to have a shape in which the clearance S is formed between the inner periphery face of the reel hub 22 and the outer periphery face of the annular extension portion 24A or the annular extension portion 26A, while the annular extension portion 24A or 26A is centered relative to the reel hub 22. For example, shapes as illustrated in FIG. 9A and FIG. 9B are possible.

Figure 9A:
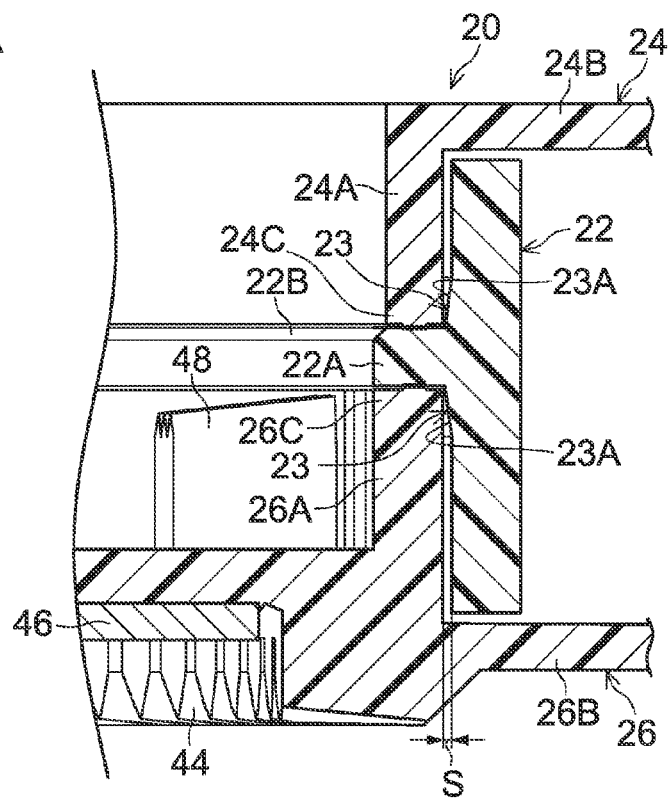
FIG. 9A is a partial magnified side sectional diagram illustrating structure of a variant example of the reel.

That is, as illustrated in FIG. 9A, each positioning portion 23 may be constituted by the inclined face 23A alone, such that the radial direction position of the annular extension portion 24A or 26A is regulated by the inclined face 23A at a boundary portion with the projection portion 22A (a line). Alternatively, as illustrated in FIG. 9B, the inclined face 23A may be not provided and the positioning portion 23 constituted with the position regulation face 23B alone. However, it is more desirable to provide the inclined face 23A because it may guide the annular extension portion 24A or 26A during insertion into the reel hub 22.

Thus, with the reel 20 relating to the present exemplary embodiment, the distal end portions of the annular extension portions 24A and 26A (the lower end portion 24C and the upper end portion 26C) may be positioned in the radial direction relative to the reel hub 22 by the positioning portions 23. Therefore, the clearances S may be formed with required dimensions. Furthermore, because this positioning in the radial direction is implemented at the distal end portions of the annular extension portions 24A and 26A (the lower end portion 24C and the upper end portion 26C), deformation of the reel hub 22 at the upper end portion side and the lower end portion side thereof will not be restricted.

Figure 9B:
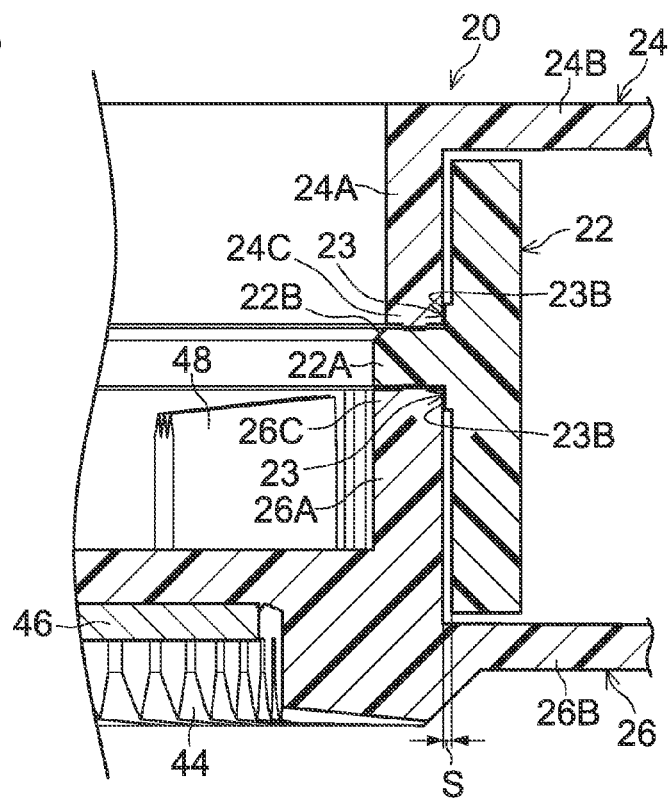
FIG. 9B is a partial magnified side sectional diagram illustrating structure of a variant example of the reel.

Beside the shapes illustrated in FIG. 6, FIG. 9A and FIG. 9B, the positioning portions 23 may be structures that are formed at the distal end portions of the annular extension portions 24A and 26A (the lower end portion 24C and the upper end portion 26C) and the projection portion 22A. For example, a structure is possible in which a protrusion (not illustrated) is provided at one of the distal end portion of the annular extension portion 24A or 26A (the lower end portion 24C or the upper end portion 26C) and the projection portion 22A, a cavity portion (not illustrated) corresponding to the protrusion is provided at the other, and positioning is achieved by the protrusion entering into the cavity portion, or suchlike.

While it is desirable if the projection portion 22A is provided protruding from exactly the middle of the height direction (axial direction) of the reel hub 22, it is acceptable if the projection portion 22A is somewhat offset in the up-down direction (the axial direction). Accordingly, in the present exemplary embodiment the position of the projection portion 22A is represented as being substantially in the middle in the height direction (axial direction). It is also acceptable for the heights of the annular extension portions 24A and 26A to be suitably adjusted correspondingly.

When the annular extension portion 24A and the annular extension portion 26A are to be welded to the projection portion 22A, it is desirable if the annular extension portion 26A of the lower flange 26 is welded first, and the annular extension portion 24A of the upper flange 24 is welded next. Accordingly, alignment of the reel gear 44 with the reel hub 22 (positioning to match the center of rotation of the reel hub 22) may be accurate. Moreover, while a configuration in which the annular extension portions 24A and 26A are joined to the projection portion 22A by welding is desirable, a configuration in which, for example, the same are joined by adhesion is also possible.

The exemplary embodiment described above has a configuration that includes the leader pin 30 to serve as a leader member. However, configurations are possible that include a leader block (not illustrated) a leader tape (not illustrated) or the like. The door 50 that closes off the aperture 18 may also be configured, for example, to move along a predetermined circular arc (not illustrated).

It is sufficient that the recording tape T be understood as being an information recording and replaying medium with a long, narrow tape form that is capable of recording information and replaying recorded information. Obviously, the recording tape cartridge 10 is applicable to a recording tape T of any recording/replaying system.

What is claimed is:
1. A reel comprising:
   a tubular hub, at an inner periphery face of which a projection portion that projects in a radial direction is formed, and around an outer periphery face of which a recording tape is wound;
   a first flange including a first flange portion provided at one end portion side of the hub, and a first extension portion that extends in an axial direction of the hub from the first flange portion and is joined to the projection portion;

a second flange including a second flange portion provided at another end portion side of the hub, and a second extension portion that extends in the axial direction of the hub from the second flange portion and is joined to the projection portion; and positioning portions, each extending between the inner periphery face of the tubular hub and one of the upper face or the lower face of the projection portion, the positioning portions being configured to regulate, in the radial direction, positions of distal end portions of the first extension portion and the second extension portion relative to the hub so as to center the first and second flanges relative to the hub, wherein a gap is formed respectively between the inner periphery face of the hub and an outer periphery face of each of the first extension portion and the second extension portion.

2. The reel according to claim 1, wherein the positioning portions are formed extending between the inner periphery face of the hub and the projection portion.

3. The reel according to claim 2, wherein the positioning portions include inclined faces at which an inner diameter of the hub becomes smaller toward the projection portion.

4. The reel according to claim 1, wherein the projection portion is formed substantially at the middle of the hub in the axial direction.

5. The reel according to claim 4, wherein the projection portion is formed in an annular shape.

6. A recording tape cartridge comprising:

a reel according to claim 1, on which a recording tape is wound;

a case accommodating the reel; and a leader member attached to an end portion of the recording tape, which leader member can be drawn out through an aperture formed in the case.

* * * * *